United States Patent
Giertz

(10) Patent No.: US 9,912,162 B2
(45) Date of Patent: Mar. 6, 2018

(54) METHOD FOR CONTROLLING A POWER CONSUMPTION OF A GROUP OF A PLURALITY OF WIND TURBINES

(71) Applicant: Wobben Properties GmbH, Aurich (DE)

(72) Inventor: Helge Giertz, Leer (DE)

(73) Assignee: Wobben Properties GmbH, Aurich (DE)

( * ) Notice: Subject to any disclaimer, the term of this patent is extended or adjusted under 35 U.S.C. 154(b) by 65 days.

(21) Appl. No.: 14/917,897

(22) PCT Filed: Jul. 15, 2014

(86) PCT No.: PCT/EP2014/065122
§ 371 (c)(1),
(2) Date: Mar. 9, 2016

(87) PCT Pub. No.: WO2015/039780
PCT Pub. Date: Mar. 26, 2015

(65) Prior Publication Data
US 2016/0226258 A1    Aug. 4, 2016

(30) Foreign Application Priority Data
Sep. 20, 2013   (DE) ................. 10 2013 219 002

(51) Int. Cl.
*H02J 1/10*       (2006.01)
*H02J 3/38*       (2006.01)
*H02J 3/14*       (2006.01)

(52) U.S. Cl.
CPC ............ *H02J 3/386* (2013.01); *H02J 3/14* (2013.01); *Y02B 70/3225* (2013.01);
(Continued)

(58) Field of Classification Search
CPC ......... H02J 3/386; H02J 3/14; Y02B 70/3225; Y04S 20/222
See application file for complete search history.

(56) References Cited

U.S. PATENT DOCUMENTS

| 8,841,796 B2 | 9/2014 | Rosenvard |
| 8,946,933 B2 | 2/2015 | Ku et al. |

(Continued)

FOREIGN PATENT DOCUMENTS

| CL | 30942015 A1 | 5/2016 |
| CN | 102168652 A | 8/2011 |

(Continued)

*Primary Examiner* — Daniel Cavallari
(74) *Attorney, Agent, or Firm* — Seed Intellectual Property Law Group LLP

(57) ABSTRACT

A method for controlling a power consumption of a group of a plurality of wind turbines, in particular of a wind park. The wind turbines are prepared for feeding electrical energy into an electrical supply network and an energy supply is offered to the wind turbines for consumption in a recurring cycle, in predetermined order successively, and subject to a total park energy supply available to the wind turbines for consumption, and the respective wind turbine reserves this or a smaller energy supply as a reference power, and subsequent wind turbines in the cycle are provided with, at most, the energy supply available to the wind park, reduced by the reference energy supply already reserved, as energy supply.

20 Claims, 7 Drawing Sheets

(52) U.S. Cl.
CPC ........... *Y02E 10/721* (2013.01); *Y02E 10/763* (2013.01); *Y04S 20/222* (2013.01); *Y04S 20/224* (2013.01)

(56) References Cited

U.S. PATENT DOCUMENTS

| | | |
|---|---|---|
| 9,362,754 B2 | 6/2016 | Borrett et al. |
| 2010/0274405 A1 | 10/2010 | Thomas et al. |
| 2011/0081226 A1* | 4/2011 | Wobben ............... F03D 7/0264 415/1 |
| 2012/0053741 A1 | 3/2012 | Beyerle et al. |
| 2013/0026757 A1* | 1/2013 | Peters .................. F03D 7/0224 290/44 |
| 2015/0054280 A1 | 2/2015 | De Boer et al. |
| 2016/0090965 A1 | 3/2016 | Busker et al. |

FOREIGN PATENT DOCUMENTS

| | | |
|---|---|---|
| DE | 19502786 A1 | 8/1996 |
| DE | 19842043 A1 | 3/2000 |
| DE | 102013219002 A1 | 3/2015 |
| EP | 2166225 A1 | 3/2010 |
| JP | 7-295626 A | 11/1995 |
| JP | 2011125171 A | 6/2011 |
| JP | 2012-39802 A | 2/2012 |
| RU | 2249287 C2 | 3/2005 |
| TW | 201319391 A1 | 5/2013 |
| TW | 201320522 A1 | 5/2013 |
| TW | 201325004 A1 | 6/2013 |

* cited by examiner

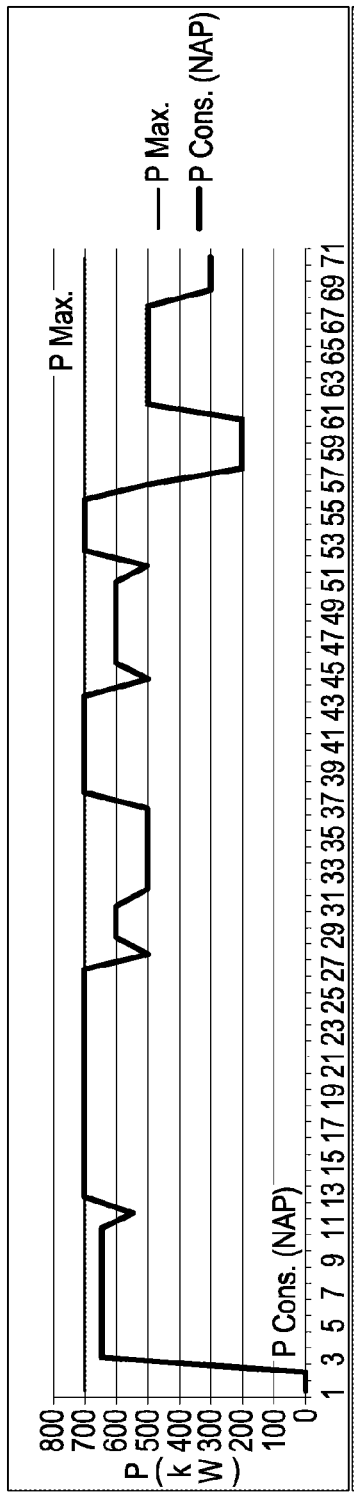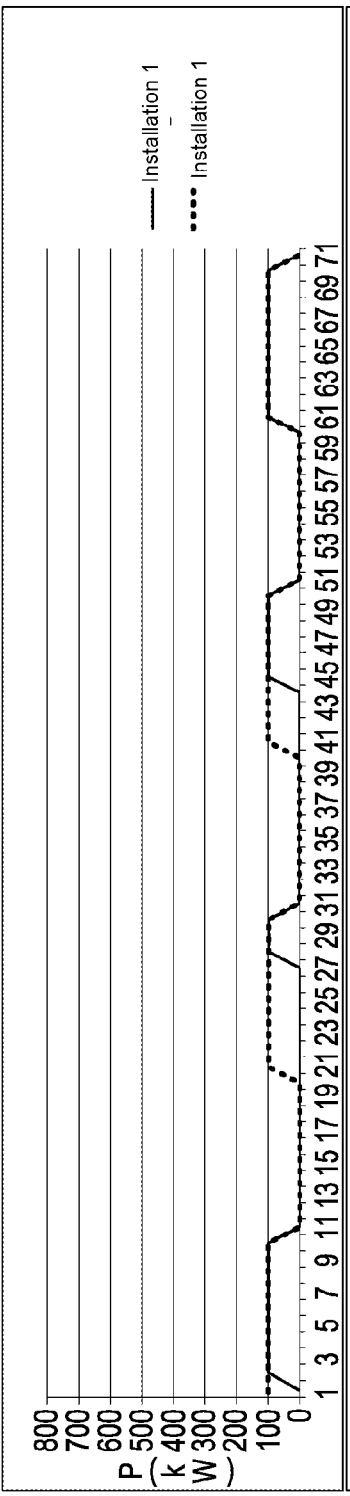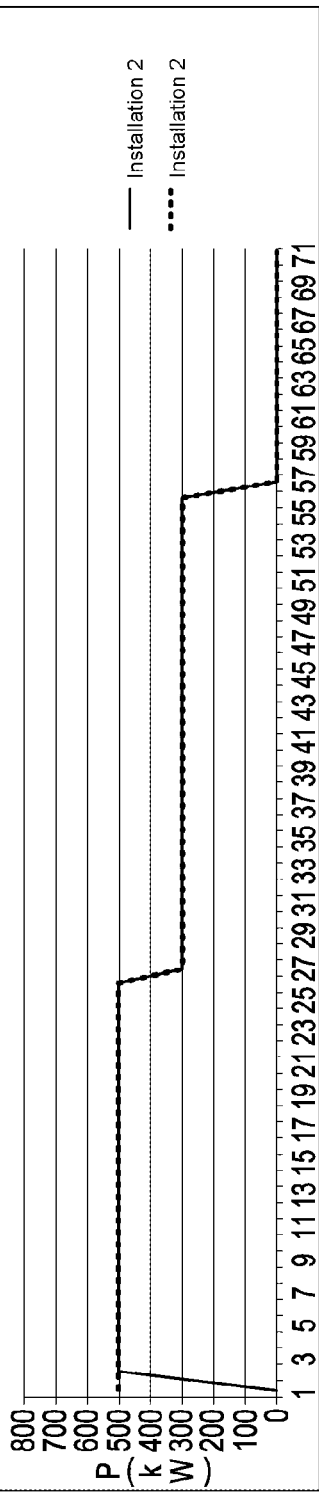

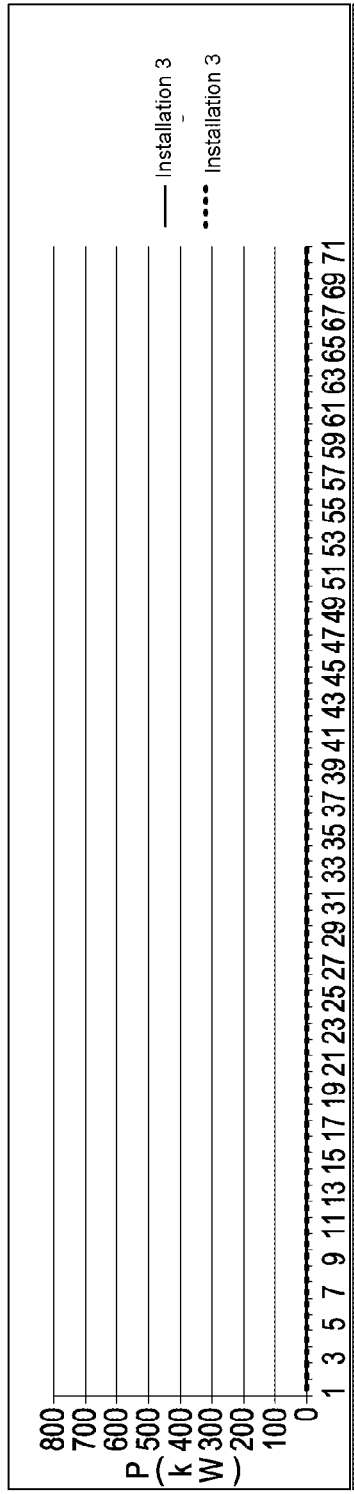
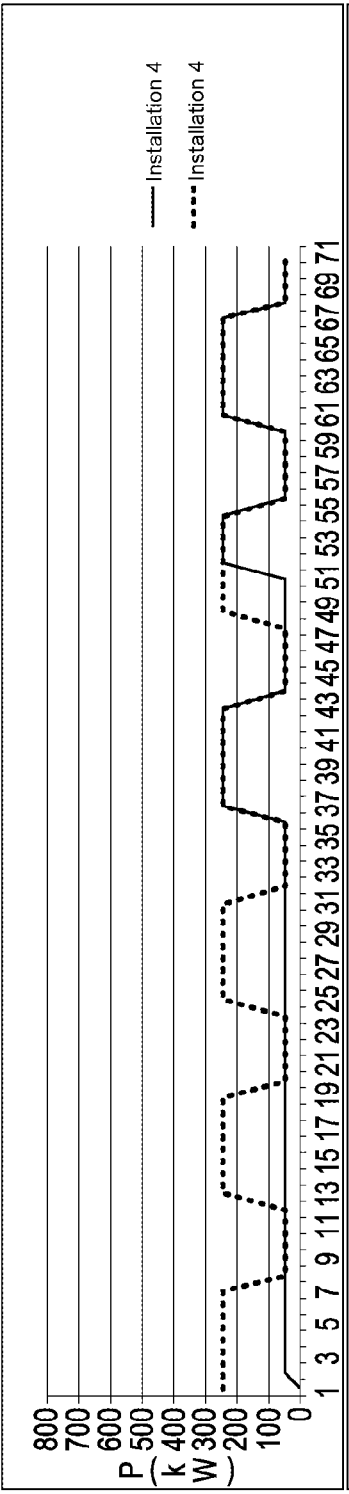
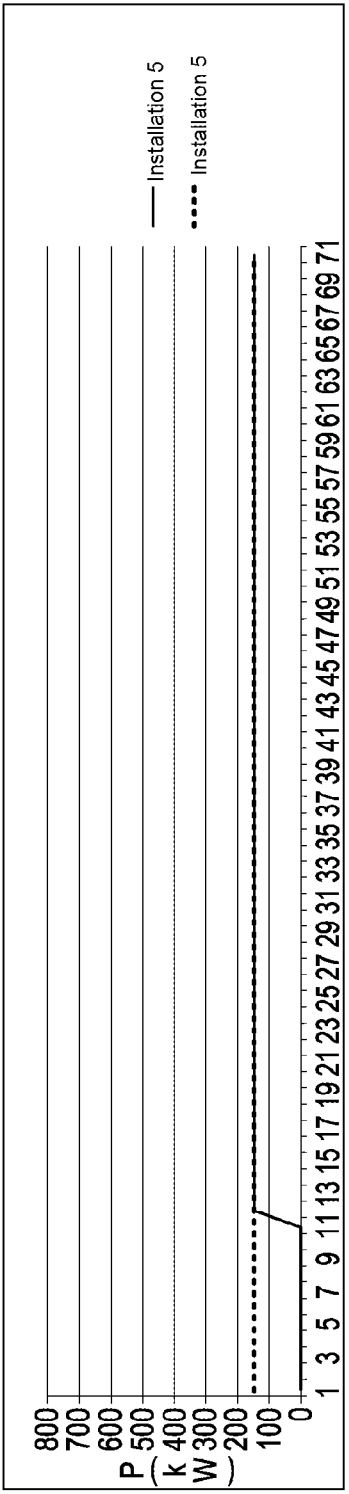

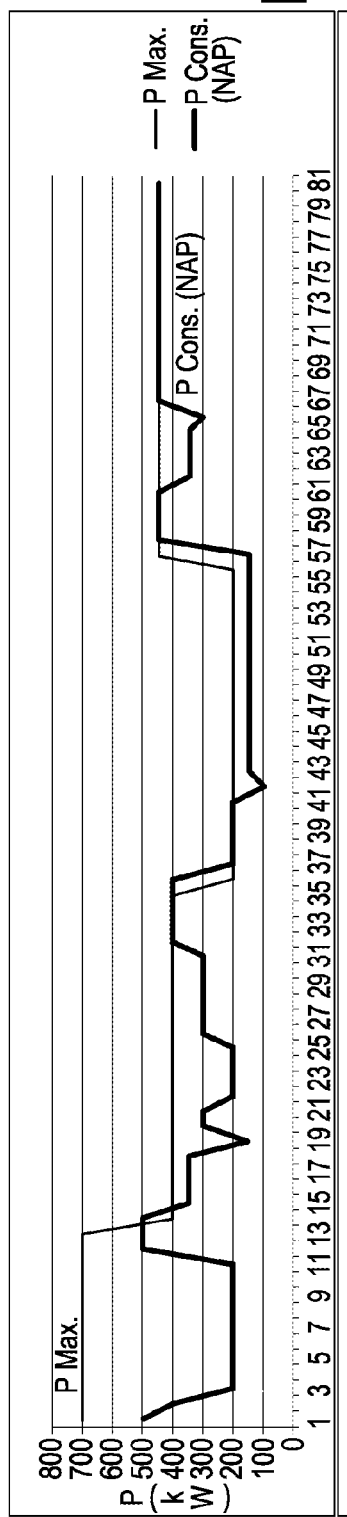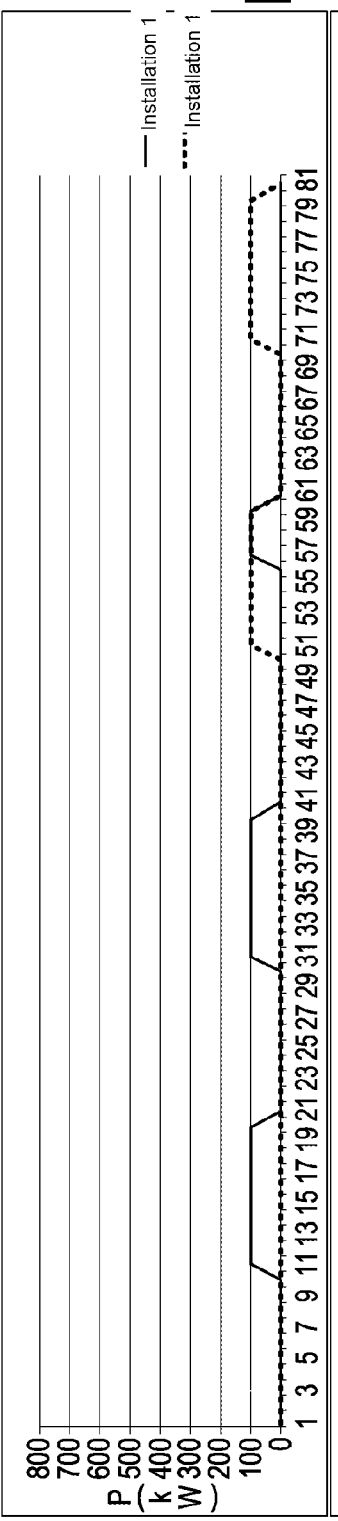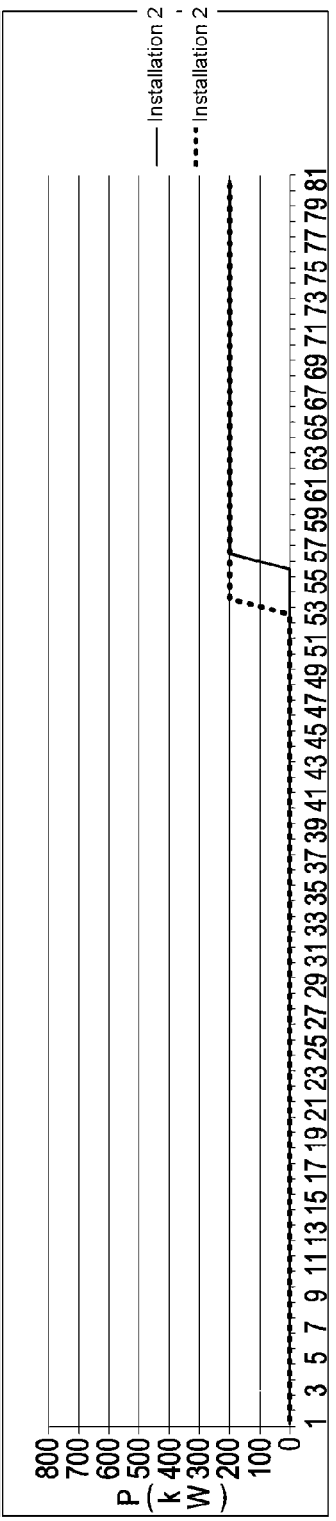

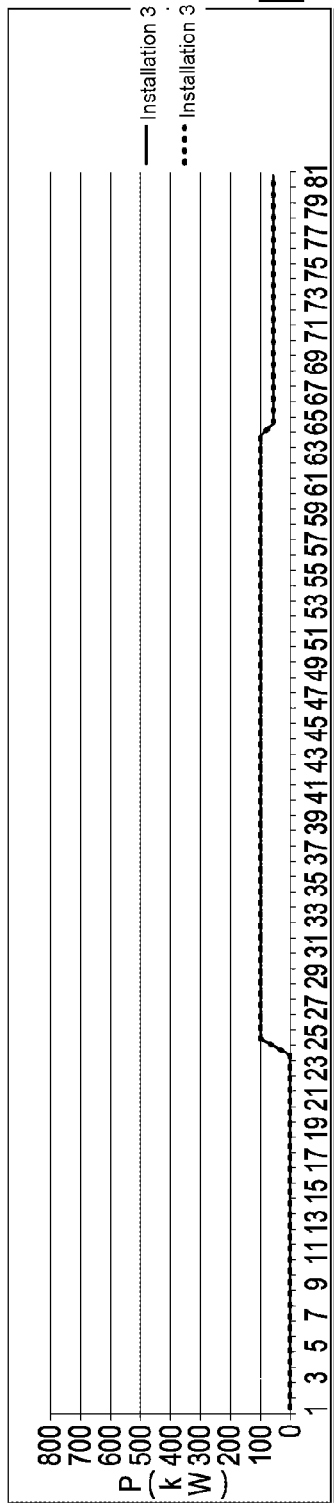
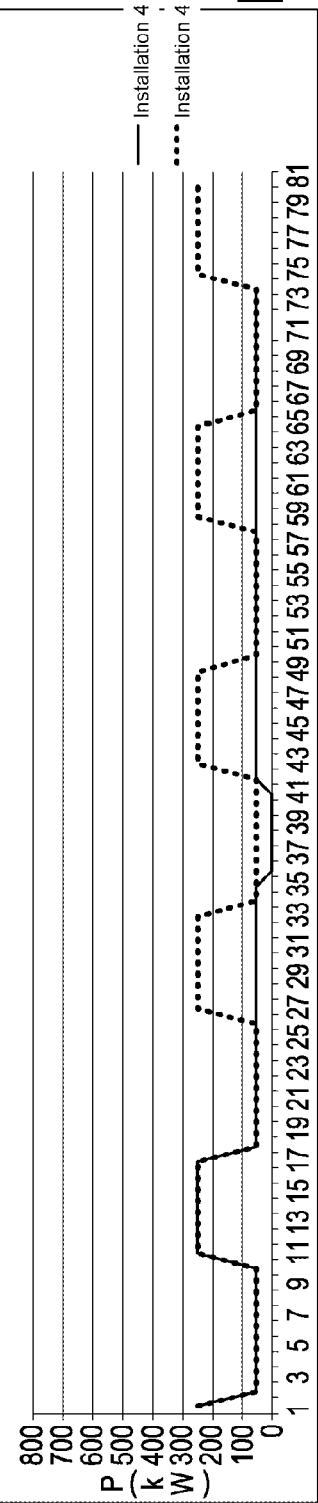
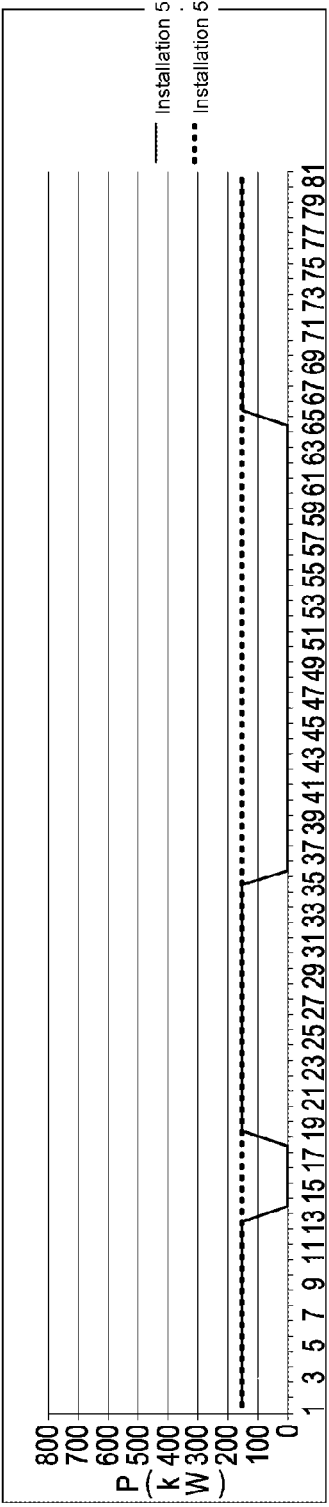
Fig. 5d
Fig. 5e
Fig. 5f

METHOD FOR CONTROLLING A POWER CONSUMPTION OF A GROUP OF A PLURALITY OF WIND TURBINES

BACKGROUND

Technical Field

The present invention relates to a method for controlling a power consumption of a group of a plurality of wind turbines, in particular of a wind park. In addition, the present invention relates to a group of a plurality of wind turbines, in particular of a wind park.

Description of the Related Art

Wind turbines and in particular wind parks are not only energy producers, but can also become major energy consumers. As a rule, this change in characteristic occurs in all wind turbines in a region at the same point in time, since most large energy consumers in a wind turbine must be connected due to weather. This applies in particular to large thermal consumers, which must restore or maintain the operational readiness of the wind turbines. For instance, such consumers may be a blade heater or a generator dryer, to name just two examples. Other consumers may also be considered.

Within some regions, the described circumstances can represent a significant problem for the network operator of the electrical supply network, to which these wind turbines are connected. These significant load flow changes cannot be calculated or predicted or, respectively, are difficult to calculate or predict and therefore must be covered by expensive reserves.

The additional costs that thereby arise are then passed on to the operator of the wind turbines, in particular the wind park.

Usually, wind turbines are self-sufficient in their management and also control the reference power, which can also be referred to as the management of the reference power. Here, reference power is understood to mean the power that the wind turbine draws for the described consumption, or for another consumption not described, thus the power it consumes and does not produce. In this case, there are large thermal consumers, which by necessity must be operated in order to restore or maintain the operational readiness of the wind turbine. What makes this problem more difficult is the fact that, as a rule, in this situation, the wind turbine often cannot produce energy or is not permitted to produce energy.

For example, if the wind turbines of a wind park are operated with blade heating to de-ice the blades, as a rule, all installations will adjust the energy production at the same time and begin the operation of the de-icing. This is mainly due the fact that such an icing of the rotor blades will occur practically simultaneously at the same site. This results in a very large reference power for the wind park, which thus exceeds a maximum allowed or, respectively, negotiated reference power and thereby causes enormous additional costs. Such a maximum allowed or negotiated reference power is a reference power that the wind park can draw from the electrical supply network without cost or without especially high cost, for example in order to start the wind park. Although, in principle, it is possible to draw more power from the electrical supply network than the negotiated reference power, power that thus exceeds the negotiated power is compensated at a very high rate.

A further problem is that energy may possibly be wasted when consuming power. For example if a prolonged dead calm is forecast for a region or a wind park, the blades will not need to be de-iced before there is a prospect of wind. Conversely, all systems can be de-iced at once if wind is forecast, without regard to the reference power. This may result in a high price for the power drawn, but may be justified by the fact that a standstill of the wind turbine when the wind is expected can be avoided. The power drawn can thus quickly be regained where applicable.

BRIEF SUMMARY

One or more embodiments of the present invention may address at least one of the above-mentioned issues. In particular, one embodiment is directed to the reference power being drawn and used as efficiently as possible, and with the lowest possible costs. At least one alternative solution to previously known methods should be proposed.

The German Patent and Trademark Office has researched the following prior art in the PCT application for this application: EP 2 166 225 A1 and DE 195 02 786 A1.

One method is based on a group of a plurality of wind turbines, which for example are all connected to the electrical supply network at a network connection point. These wind turbines of this group may be part of a wind park, or the group, and therefore the wind turbines thereof, may form the wind park, however other configurations of the group may also come under consideration. In actuality, a common case should hereby be a wind park, which forms this group and, in this respect, reference will frequently subsequently be made to a wind park. All such explanations of a wind park are nevertheless also applicable to a group of wind turbines that do not necessarily form a wind park, unless this is expressly stated otherwise in the description.

An energy supply should thus be offered to the wind turbines of this group for consumption gradually, in a cycle. In so doing, the wind turbines are first sorted in a specified order. These wind turbines are essentially processed one after the other in this order as described below. This predetermined order may, for example, be a function of boundary conditions, in particular environmental conditions such as the direction. For example, the first wind turbine in this predetermined order may be the wind turbine that is also in front in terms of the current wind. In this case, it is essentially the most important wind turbine and also receives top priority in its handling, as explained below.

This order can also be modified, however, in particular when, in the above mentioned example, the wind direction changes. Other criteria are also taken into account, for example the size of the wind turbine, insofar as this differs within the group. If a wind turbine must be throttled in its operation as compared to other wind turbines, for example for reasons of noise reduction or for other reasons, this installation may be disposed further back or entirely in the back of the predetermined order. The wind turbines of this group under consideration are thus successively processed in the cycle in the predetermined order. In so doing, an energy supply for the consumer is offered to each of the wind turbines, namely starting with the first wind turbine in the order. The wind turbine in question, thus initially the first wind turbine, reserves this or a lesser energy supply as a reference power. For the sake of simplicity, it may be assumed here that the wind turbine actually draws and consumes this reserved reference power. For example, the installation management of the wind turbine in question determines that heating the rotor blades is necessary for de-icing and heating the generator is necessary for drying. This management knows the power values for these heating devices and reserves the power needed therefor, thus for the blade heating and the generator heating, from the energy supply offered as a reserved reference power. The wind turbine can then draw this power and, accordingly, can heat the rotor blades and the generators.

The power available to the wind park can be and is then offered to subsequent wind turbines, thus initially the second wind turbine in the order, which power has already been reduced by the reserved reference power.

The power available to the wind park comprises a predetermined, negotiated withdrawal capacity from the electrical supply network and a wind park output available within the wind park or the group of wind turbines by means of power generation and/or accumulation. In the simplest case, when the wind park or the group of wind turbines does not generate any power and has no energy stored, the power available to the wind park corresponds to the negotiated withdrawal capacity. The withdrawal capacity is thus in particular a power for which it is negotiated with the operator of the electrical supply network that said power may be obtained from the electrical supply network, namely the total power that may be obtained by the group or, respectively, the wind park. In particular, only a small compensation is provided to the network operator, thus to the operator of the electrical supply network, for this withdrawal capacity.

This power available to the wind park essentially limits the maximum value for the power that can be offered to a wind turbine. Here, an energy supply originating with this power available to the wind park is offered to the first wind turbine. This energy supply corresponds at most to the power available to the wind park. Frequently, however, less is offered, as will be explained below.

The first wind turbine can now reserve this energy supply in the full amount offered as a reference power, or it can reserve less reference power or, if applicable, no reference power.

An energy supply in the amount of at most the power available to the wind park can be offered to the next wind turbine, minus the reference power already reserved by the preceding wind turbines. In the case of the second wind turbine, the reference power reserved by the first wind turbine is subtracted. In the case of the third wind turbine, insofar as one exists, the reserved reference power of the first wind turbine and the reserved reference power of the second wind turbine are subtracted from the potentially available power, and so forth.

The method thus proposes a prioritization which ensures that the need of the first wind turbine is covered as much as possible. The subsequent wind turbines may then possibly not draw enough reference power in the event that the first or further preceding wind turbines do not leave sufficient power available. In this regard, the preceding wind turbines draw power in the predetermined order, in which the wind turbines are processed in the cycle.

In each case, the energy supply offered to each of the wind turbines in the current cycle is preferably calculated from a current, available reference power, plus the reference power reserved by this wind turbine in the preceding cycle. Thus each cycle and every step thereof, thus the processing of each individual wind turbine, is based on a new available reference power. The available reference power may remain unchanged from one to the next wind turbine in a cycle. At any rate, this available reference power forms the basis and the calculation thereof is explained below.

This is based on the consideration that at least the power that a current wind turbine has reserved during the preceding cycle can be offered to that wind turbine. If power is still available, it may be offered to the current wind turbine. The calculation of the reference power available to the first wind turbine is preferably made in a manner that is essentially different than for the additional wind turbines, wherein this refers to the predetermined order of wind turbines.

The available reference power is preferably calculated for the first wind turbine from the power available to the wind park, minus the current reference power for the wind park. Thus the above-mentioned power available to the wind park is taken as a basis, namely the negotiated withdrawal capacity plus, if applicable, additionally generated power or power that has been stored. The reference power for the wind park that is currently being withdrawn from the electrical supply network by the group or, respectively, the wind park, is subtracted from this power available to the wind park.

The currently withdrawn reference power for the wind park can be measured. Alternatively, instead of the currently withdrawn (measured) reference power for the wind park, the total of the reserved reference power for the group may be used and subtracted from the power available to the wind park accordingly. This total of the reserved reference power may approximately correspond to the withdrawn reference power for the wind park, in particular if the wind park is not generating power or cannot make this power available from storage.

These are two variants for calculating the available reference power for the first wind turbine. In the simplest case, no energy that is generated or that is obtained from storage is present, and the power available to the wind park corresponds to the negotiated, that is the maximum negotiated, withdrawal capacity. This withdrawal capacity may then correspond to the available reference power if no reference power has yet been withdrawn from the network. If the wind turbines, or at least one of these installations, have reserved a reference power and also withdraw said reference power, however, the available reference power is reduced by this value, namely by the amount of power that is withdrawn by all wind turbines of the group together. Accordingly, the available reference power is calculated for the first wind turbine, namely from the power available to the wind park minus the current reference power for the wind park of the group or of the wind park that has been withdrawn from the network.

Thus an available reference power is first determined for the first wind turbine. This available reference power is preferably now used as a basis in determining the reference power of the subsequent wind turbines, thus initially for the second wind turbine. In so doing, this available reference power is reduced for a subsequent wind turbine if the current wind turbine has increased its reserved reference power as compared to the preceding cycle. Thus in calculating the second wind turbine, the available reference power of the first wind turbine is reduced for the second wind turbine, if the first wind turbine has increased its reserved reference power as compared to the preceding cycle.

This is namely based on the idea that at the start of each cycle, the available reference power is recalculated from the power available to the wind park minus the currently drawn reference power for the wind park. This is the available reference power for the first wind turbine. If the first wind turbine now increases its reserved reference power, and thus also increases the reference power that it actually withdraws, the initially calculated available reference power is reduced by this value and accordingly, a reduced available reference power is available to the subsequent wind turbine, thus initially the second wind turbine.

If the reference power reserved by the first wind turbine is reduced, however, a correspondingly increased available reference power would be available to the subsequent wind turbine. However, in this case, it is proposed that an increased reference power not be offered to the subsequent wind turbine. Instead, it is proposed that the available reference power be left unmodified if the first wind turbine or, respectively, another preceding wind turbine reserves less reference power than it reserved in the preceding cycle. This ensures that any resulting additional available reference power, thus reference power that has again been freed up, is not passed on to wind turbines that are located further back in the predetermined order. Reference power that is again freed up in a cycle should not initially be offered to wind turbines of a lower priority.

Power or quantities of power that are thus freed up can also be passed on to wind turbines that are further back in the order only in a new cycle. If reference power is freed up within a cycle because a wind turbine has reserved less reference power than in the preceding cycle, less reference power is accordingly drawn from the network, and the effect thereof is seen at the beginning of the next cycle, namely when the available reference power for the first wind turbine is recalculated. In the calculation of the available reference power, the reference power for the wind park is then subtracted from the power available to the wind park from the network, and thus less reference power for the wind park is subtracted than in the preceding cycle. This thereby increases the available reference power in the first step of the cycle, namely for the first wind turbine. This first wind turbine can now decide before all other installations whether it would like to reserve correspondingly more reference power. Only when this first wind turbine does not wish to reserve this power, or only wishes to reserve a part thereof, is this reference power that has been freed up offered to other wind turbines located further back in the order. A prioritization is hereby achieved, wherein the reference power that is freed up is initially offered to the first wind turbine and is only offered to subsequent installations if the first wind turbine does not need this power. The supply of power to the first wind turbine is hereby made a priority.

The predetermined order, in which one wind turbine after the other is processed as a cycle, is preferably determined or modified as a function of one or a plurality of boundary conditions. To this extent the order can be flexibly adjusted or modified, wherein a order that has been predetermined is not immediately modified, but rather is retained for many cycles, in particular for several hours. This may often already be the result of boundary conditions that remained unchanged for an extended period of time. A boundary condition may be the direction of the wind. In this case, it may be useful to give first priority to the wind turbine that is facing the wind, and thus to place this installation in the first position in the order. If, for example, the group of wind turbines, in particular the wind park, is to be started up after a dead calm because of increasing wind, while there is possibly icing present, it would thus be proposed that the foremost wind turbine be supplied with the reference power that it needs, but within the predetermined limits, and thus that first and foremost, de-icing be made possible for this wind turbine. This wind turbine can then start at once and generate power, which sometimes quickly exceeds the power that can be withdrawn from the network, which therefore substantially exceeds the negotiated reference power that can be withdrawn.

If this wind turbine needs reference power for de-icing and to dry the generator, and if drying is completed before de-icing, to name a simplified example, the reference power needed for drying can already be freed up for other wind turbines.

Other boundary conditions may be taken into consideration, for example based on past experience, according to which a wind turbine has lighter or heavier icing. This installation could then be placed further back in the order because a wind turbine that experiences less icing, which may be a function of the local topography, can be de-iced more quickly and then provide the power needed to de-ice the additional installations, to continue this example. This effect may also be a function of the wind direction and/or properties of the air, in particular the air humidity.

It is preferably proposed that the withdrawal capacity that is to be withdrawn from the electrical supply network be based on a value that corresponds to the sum of all possible power usages by the wind turbine of the group, corresponding to the greatest sum of all possible power usages.

Such a prioritization, in which at least one wind turbine is provided with sufficient reference power, is provided by means of the method for controlling the power consumption of a group of a plurality of wind turbines. Using the method, it is thereby possible to achieve the adequate supply of the wind turbine having the top priority with reference power, even when comparatively little reference power is available. To this end, it can be sufficient if enough reference power is provided as required by only one wind turbine. Insofar as the wind turbines differ, this should be oriented towards the wind turbine that requires the greatest amount of reference power, thus which consumes the greatest quantity of power when all consumers are needed simultaneously. It is meaningful here that the total used as a basis is only for those consumers, which, for logical or technical reasons, can be operated simultaneously.

Accordingly, it can thereby be achieved that the smallest possible withdrawal capacity between the group of the wind turbines, in particular the wind park, and the network operator can be negotiated. For the wind park operator, this can mean that he can negotiate favorable conditions and for the network operator, this can mean that he must only provide a very small amount of reference power, and thus need only calculate with a small amount of reference power. This, in turn, can improve the network stability and or can, at least in part, free the network operator from the costly provision of such power.

According to an additional embodiment, it is proposed that the reserved reference power be reduced by at least one of the wind turbines when the sum of reserved power from the preceding cycle is greater than the power available to the wind park.

Such a situation may arise in particular when it was possible to make a great deal of energy supply available to the wind turbines because power was also being generated within the wind park, and this power could be used. If this power generation is lost or reduced, it may lead to a case like the one described, and in this case, power is basically taken away from the wind turbines, starting from those located at the back of the order, until the first wind turbine has sufficient power.

Such a situation may arise when the withdrawal capacity to be withdrawn, namely that capacity in particular that was negotiated with the network operator, is reduced. This may be due to a corresponding previous temporary agreement, for example.

A reduction in already reserved reference power is preferably implemented in that the cycle for making energy supply available is now run through in the opposite order.

Thus power is first taken away from the wind turbine that is at the very end of the order, and if this is not sufficient, from the next to last etc. In this way, successively available reference power can be obtained for the first wind turbine. Thus the prioritization of the first wind turbine is maintained in allocating the reference power.

The reserved reference power of each respective wind turbine is preferably used to heat the rotor blades thereof. In addition or alternatively, this energy will be used to heat the generator of these installations. The generators are heated to remove condensation, thus to dry the generator or, respectively, ensure that it is dry. In addition or alternatively, the reserved reference power or, respectively, a part thereof can be used to start the wind turbine. In particular, this concerns energizing one or a plurality of azimuth motors, in order to place the wind turbine in the wind. In addition or alternatively, it concerns the energizing of the so-called pitch motors, which rotate the rotor blades in the corresponding angle towards the wind, which is also referred to as pitch. To a comparatively limited degree, the provision of power to start the wind turbine may also concern the supply of power to control equipment including control computers. If applicable, power can also be used to de-ice a nacelle anemometer.

The cycle is preferably repeated in a time range of a half minute to five minutes, preferably in a time range of one to three minutes, and in particularly approximately every minute. This determination of the cycle repetition in the range of a half minute to five minutes allows the cycle sufficient time to query all of the wind turbines that must be queried in that time, and to make the appropriate energy supply available to those installations. During this time, the appropriate power initially only needs to be offered by a central processor or, respectively, only needs to be reserved by the respective control of the individual wind turbine. In this regard, it is an IT process, in which the power need not yet be actually requested and used. However the wind turbines can, in fact, immediately begin drawing the reserved power.

The above-mentioned ranges of minutes also fall in the range, in which de-icing a rotor blade and/or drying a generator and/or de-icing an anemometer can be carried out.

In addition or alternatively, according to one embodiment it is proposed that it be possible to manually interrupt the cycle and in the event of such a manual interruption, that the reference power can be manually assigned to each wind turbine. This may be the case, for example, when service personnel are on site, or this may be done from a remote location.

After the end of such a manual interruption of the cycle, the cycle can start again with the first wind turbine. At least according to some embodiments, the energy supply offered is calculated, as described above, for the first wind turbine without using the values offered or reserved in the preceding cycle, but rather, based on the actual reference power drawn from the electrical supply network. In this regard, restarting the cycle after an interruption is readily possible and preceding values need not be taken into account and/or buffered.

According to one embodiment, it is additionally proposed that at least one of the following values be kept constant should a communication failure occur between the wind turbines of the group or of the wind park. This may concern the retention of the reserved quantities of reference power of the wind turbines of the group. In addition or alternatively, this may also concern the power available to the wind park and/or the current reference power for the wind park. This is preferably done for a predetermined transition period. If this transition period is exceeded, it may be useful to initiate other measures, including the manual takeover of the process.

A group of a plurality of wind turbines, in particular a wind park, is also proposed, which is prepared to carry out a method according to at least one of the above-described embodiments.

This group preferably has a central control unit for performing the method, in particular a wind park control unit. An existing wind park control unit may also be used to this end and can be adapted accordingly. In particular, the wind park control unit should know the negotiated reference power in terms of quantity, and it should have metering access to the respective power currently being drawn from the network or, respectively, to such measured values. In addition, the central control unit should have a communication with the wind turbines.

BRIEF DESCRIPTION OF THE SEVERAL VIEWS OF THE DRAWINGS

The invention will now be described by way of example below and with reference to the accompanying Figures.

FIGS. 4a to 4f show an exemplary progression of the distribution of reference power in the case of a fixed withdrawal capacity.

FIGS. 5a to 5f show an exemplary progression of the distribution of reference power in the case of a variable withdrawal capacity.

DETAILED DESCRIPTION

Figure 1:
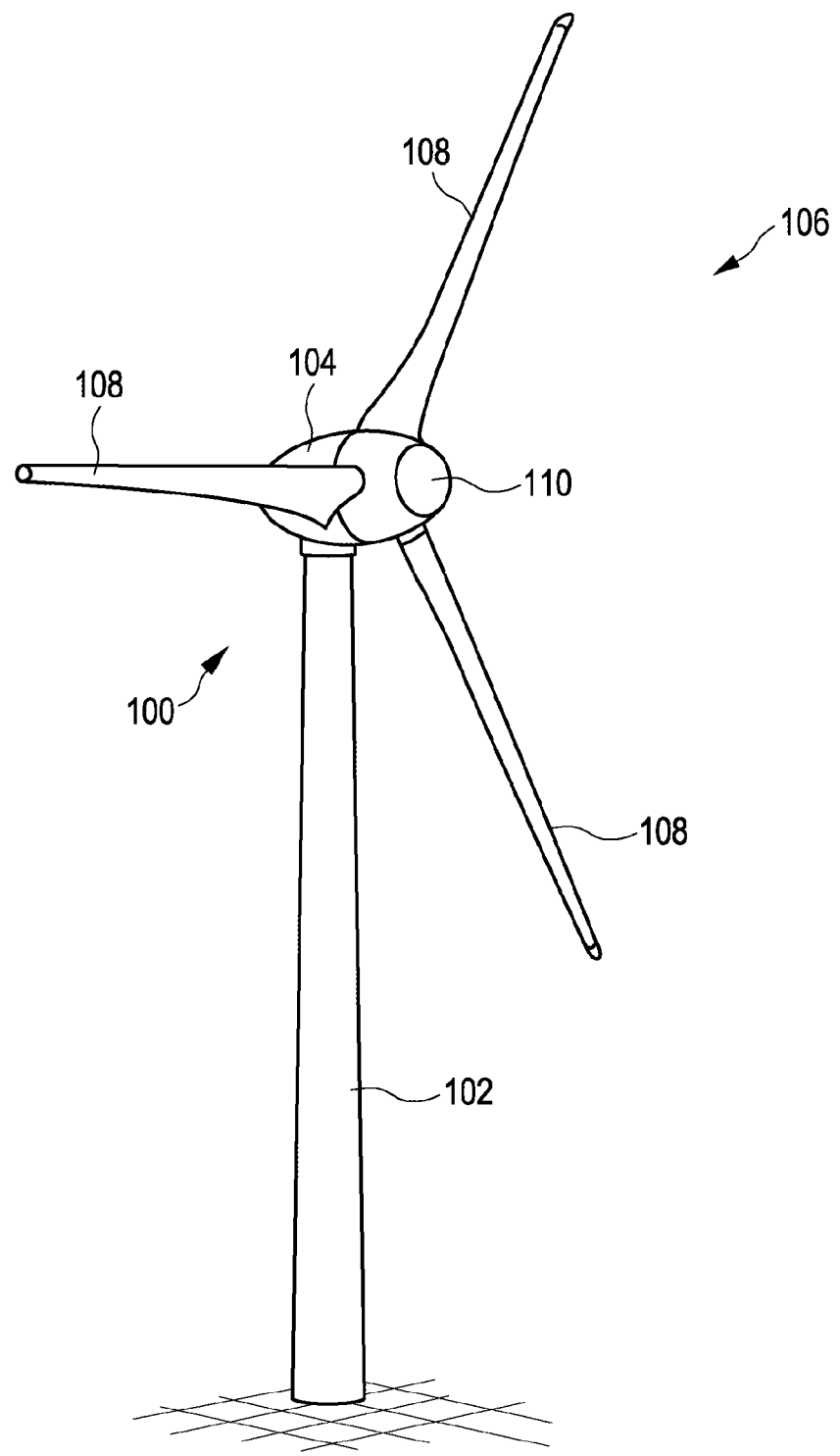
FIG. 1 schematically shows a wind turbine.

FIG. 1 shows a wind turbine 100 having a tower 102 and a nacelle 104. A rotor 106 having three rotor blades 108 and a spinner 110 are disposed on the nacelle 104. During operation, the rotor 106 is moved in a rotational movement by the wind and thereby drives a generator in the nacelle 104.

Figure 2:
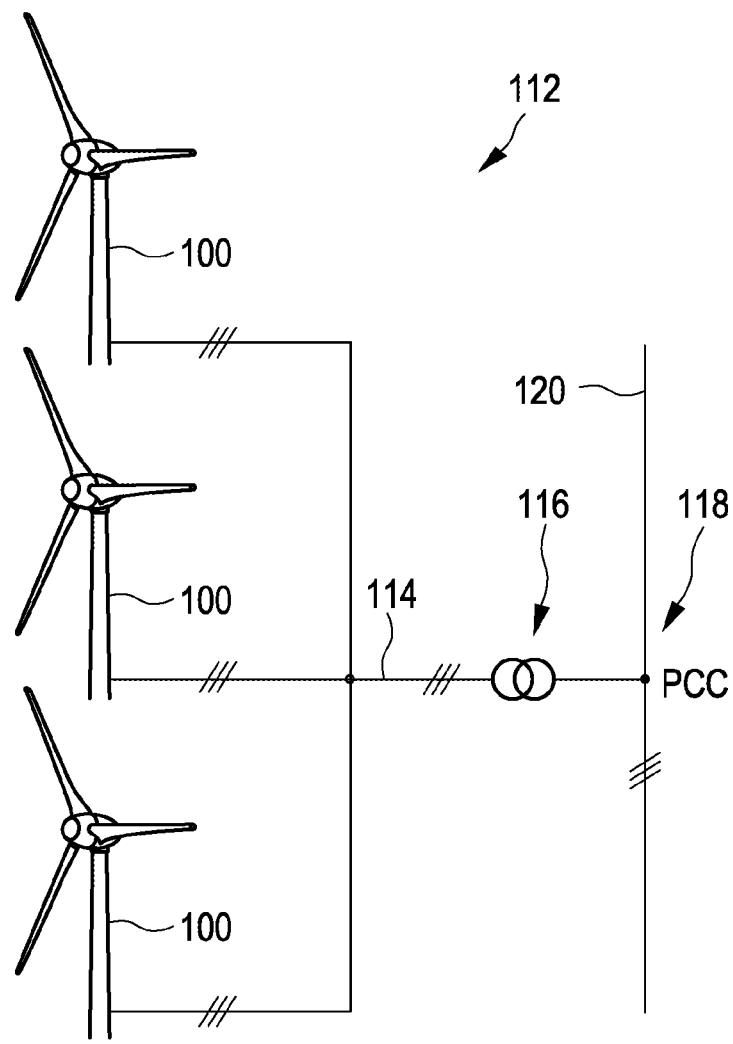
FIG. 2 schematically shows a wind park.

FIG. 2 shows a wind park 112 having three wind turbines 100, by way of example, which may be identical or different. The three wind turbines 100 thus basically represent any number of wind turbines of a wind park 112. The wind turbines 100 provide power, namely in particular the generated current, by means of an electrical wind park network 114. In so doing, the respective currents generated or, respectively, quantities of power from the individual wind turbines 100 are added together and usually a transformer 116 is provided, which steps up the voltage in the wind park in order to feed said voltage into the supply network 120 at the feed point 118, which is also generally referred to as the PCC. FIG. 2 is just a simplified illustration of a wind park 112, which, for example, does not show a control, although naturally a control exists. For example, the wind park network 114 may be configured differently, whereby a transformer is also provided at the output of each wind turbine 100, to specify just one other embodiment.

Figure 3:
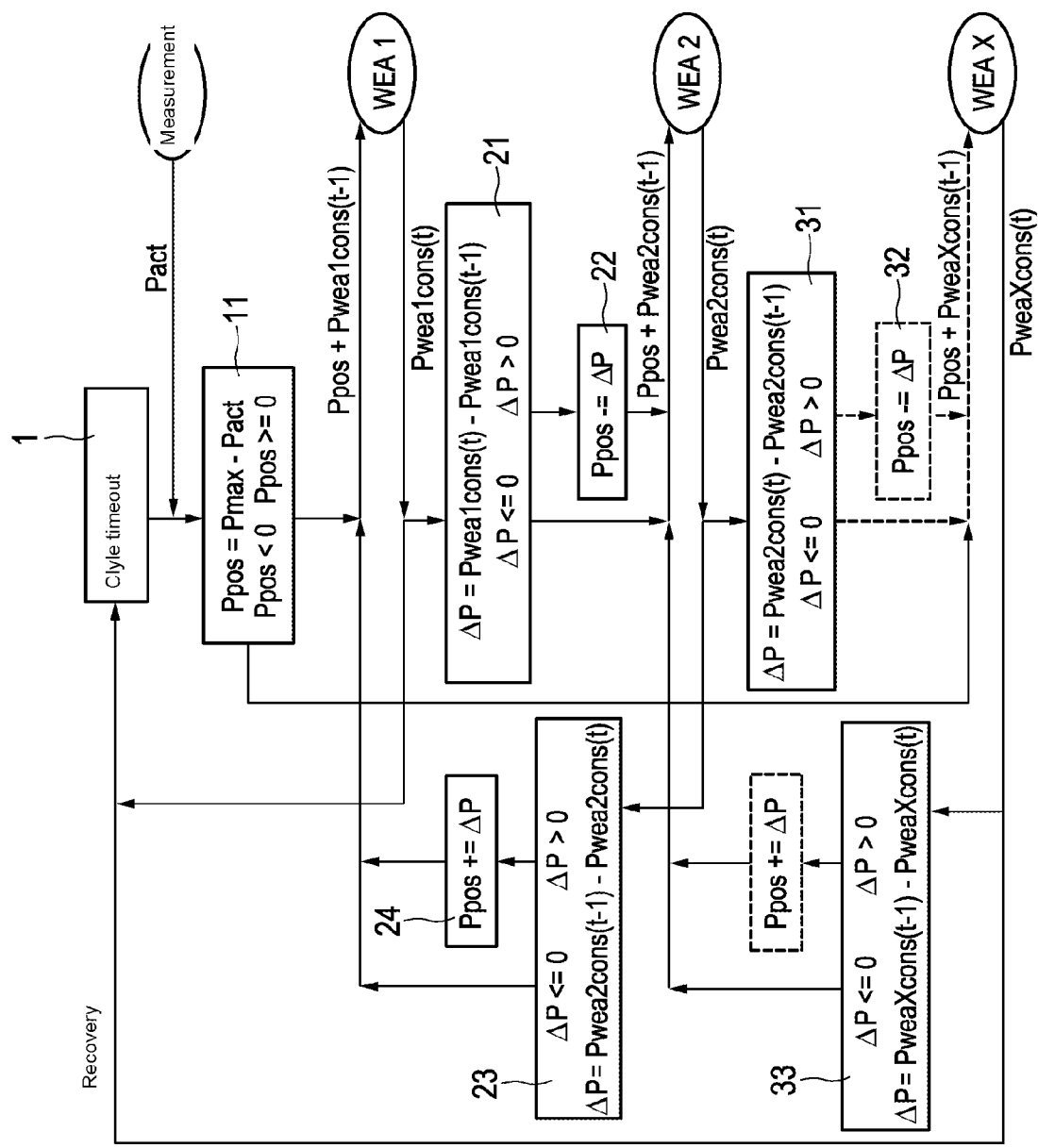
FIG. 3 shows a flow chart for the distribution of reference power.

FIG. 3 shows a flowchart for the distribution of reference power. Here, the right or, respectively, middle area of the flow chart show the energy supply being offered, and the corresponding reference power being reserved. In the left part of the flow chart, which is labelled "Recovery", shows reserved reference power being recovered by wind turbines. The following variables are used in the diagram:

Ppos: Reference power that is possibly available. This refers to the reference power, which may be offered in the respective step in the process and therefore in the cycle of the respective installation, plus the power said installation has previously reserved.

Pmax: Maximum reference power, namely the maximum power that may be withdrawn from the electrical supply network for all wind turbines in question together as per negotiation. This is also described as the negotiated withdrawal capacity to be withdrawn from the electrical supply network. In the example shown in FIG. 3, this maximum reference power is identical to the power available to the wind park, because in this illustration, power that is generated by the wind turbines or, respectively, that could be drawn from power storage is not taken into account, and therefore has the value 0.

Pact: Current power network connection point (NAP). This is the power that is withdrawn at the network connection point, and therefore the power that is withdrawn from the electrical supply network for all of the wind turbines in question together. In this regard, it also represents an actual value or, respectively, a measured value. Optionally or, respectively, for the sake of simplicity, Pact is formed as the sum of the quantities of reference power reserved in the preceding cycle by all wind turbines.

PweaXcons(t): reference power of installation X, thus the respective installation being considered from the current cycle.

PweaXcons(t−1): reference power of installation X, thus the respective installation being considered from the preceding cycle. These two values, PweaXcons(t) and PweaXcons(t−1), thus refer to the reference power that the installation in question has actually reserved and, in particular, has actually consumed. Here, the "X" is a place holder for a figure, which indicates the number of wind turbines in question in the cycle or, respectively, the predetermined order.

$\Delta P$: Difference of the (reserved) reference power of a wind turbine between two cycles.

A cycle, "timeout cycle," starts in block 1. Subsequent to this, the current power, Pact is initially measured at the network connection point. In block 11, the possibly available reference power is calculated, namely from the negotiated maximum reference power that can be withdrawn, Pmax, minus the actual current power withdrawn, Pact. If the result is a value for Ppos that is greater than or equal to 0, the power Ppos plus the reserved reference power of this wind turbine from the preceding cycle is offered to the wind turbine as an energy supply: it is offered as Ppos+Pwea1cons(t−1).

If the available reference power Ppos is less than 0, however, the process branches off below in the flow chart and the process of recovery, described below, is started.

If the available reference power Ppos is positive or at least 0, however, this power, together with the reference power reserved during the preceding cycle, is offered to the first wind turbine and the wind turbine 1, which is referred to as WEA 1, reserves a reserved reference power within this context, namely Pwea1cons(t). This value is also used in the calculation of an energy supply for the second wind turbine WEA 2.

In block 21, a check is initially made to see whether the reference power of the first wind turbine has been reduced or not. To this end, the reference power difference $\Delta P$ is calculated accordingly:

$$\Delta P = P\text{wea1cons}(t) - P\text{wea1cons}(t-1).$$

If $\Delta P$ is greater than 0, the preceding, which is to say the first wind turbine in block 21 has increased its reserved reference power, the available reference power, Ppos, is reduced, namely by this value, $\Delta P$:

$$P\text{pos} = P\text{pos} - \Delta P.$$

This is shown in block 22.

Now the energy supply in the amount of the available reference power Ppos plus the reference power reserved in the preceding cycle by the second wind power, Pwea2cons(t−1), is offered to the second wind turbine. The second wind turbine WEA 2 may now reserve a reference power in this amount, or it may reserve a lesser amount of reference power, namely the currently reserved reference power Pwea2cons(t) of the second wind turbine WEA2.

Based on the values for the reserved reference power of the second wind turbine from the preceding cycle and the current cycle, a check is made in block 31 to see whether the reserved reference power of the second wind turbine WEA 2 has increased or decreased. If necessary, a new, specifically lower value is determined for the available reference power, Ppos, in block 32 in a manner analogous to the calculation in block 22. Based thereon, a Ppos is calculated for the next wind turbine, which is referred to here as the X-th wind turbine, WEA X, representing each additional wind turbine, and an energy supply is offered based on this Ppos.

When running through the cycle, energy supply is offered to the wind turbines 1 to X, one after the other, and if necessary, a reference power is reserved thereby.

An energy supply is offered to each wind turbine, 1 to X, in this cycle and a reference power is reserved accordingly within this context by the wind turbine in question. In so doing, the process progresses such that the first wind turbine is prioritized, and subsequent wind turbines are likewise given a priority in accordance with their respective position in the order.

If it turns out that more power is drawn than was reserved, a negative value is given in block 11 for the possibly available reference power Ppos. Accordingly, there is a branching off from block 11 directly downward and this negative value of the available reference power plus the reference power that was reserved by this Xth wind turbine in the last cycle is offered to the last wind turbine. Thus Ppos+PweaXcons(t−1) is offered to the Xth wind turbine. Thus this value is smaller than the reference power value reserved in the preceding cycle, PweaXcons(t−1), because the possibly available reference power Ppos has a negative value. Within this context, the wind turbine X may reserve a reference power, PweaXcons(t), namely less than that reserved in the preceding cycle. In Block 33 a check is then made to see whether and to what degree less reference power was reserved by the wind turbine X than in the preceding cycle. The possibly available reference power Ppos is then increased in block 34 by this difference value of the reference power of the wind turbine X between two cycles:

$$P\text{pos} = P\text{pos} + \Delta P.$$

For example, this may mean that a negative value of 4 kW has resulted in block 11 for Ppos. If the reserved reference power of the wind turbine X is reduced by 2 kW, because this installation previously reserved 2 kW and now has not reserved additional reference power, the value for the difference of the reference power $\Delta P$ in block amounts to 33+2 kW and Ppos is increased in block 34 by 2 kW, namely from negative 4 kW to negative 2 kW. The possibly available reference power Ppos can be further increased for additional wind turbines in that wind turbines are afforded less reserved reference power or, respectively, the reference power those installations have reserved is cancelled. This is shown by way of example in blocks 23 and 24, which correspond analogously to blocks 33 and 34, however for wind turbine 2.

According to the outcome of blocks 23 and 24, the value of Ppos of the wind turbine 1, which has hereby hopefully been increased to at least 0, plus the reference power, Pwea1cons(t−1), that the first wind turbine reserved in the preceding cycle, can finally be offered to the first wind turbine, WEA 1, as an energy supply. Thereafter, the cycle ends and begins again in block 1. If no reserved reference power is recovered, blocks 33, 34, 23 and 24 are not used and the cycle returns to block 1 at the end of the wind turbine X, and the cycle begins again after the accordingly determined period of time.

In addition to this, the following is generally explained.

The reference power management for wind turbines, hereinafter referred to as WEA, functions in a group-oriented manner. Groups are selectively chosen wind turbines, which are all connected to one network connection point, for example. Processing is cyclical (e.g., every 1 min.).

The still available reference power (Ppos=Pmax−Pact) is determined at the start of each cycle. The currently drawn power (Pact) needed herefor may be provided by an installed measurement at the network connection point or by forming the sum of all reserved quantities of reference power, and is the minimum value (maximum value for the reference power) over the reference power management cycle.

All wind turbines of the group are called in order with the reference power (Ppos+PweaXcons(t−1)) available to those installations. This reference power is formed by the total available reference power (Ppos) and the reserved power (PweaXcons(t−1)) for the respective installation from the preceding cycle (power that was already reserved and that is currently being consumed).

If power is needed in the wind turbine and if the available power is sufficient, the installation may take on the power it needs. The installation returns its current, total reference power (PweaXcons(t)) as an acknowledgement.

If the installation has taken over additional reference power (ΔP>0), the reference power available to the subsequent installation is corrected (Ppos−=ΔP). If the power is released again, it is ignored in this cycle.

The priority management is formed in the system by ignoring the reference power that is released by an installation, since this released power is not offered to the subsequent installations in the cycle order. This power can only be posted as available during the next cycle. In this way, the installations that are located further in the front of the request list are more likely to have an opportunity to reserve power.

If more power is drawn than is reserved, the reserved reference power must be taken away from the installations. This is the case when the maximum reference power (Pmax) is reduced, i.e., a smaller target value is specified. In the case of this exception, the forced return of the reference power is carried out in accordance with the priority list. Installations having a low priority must give up their power first. The order in which the installations are called on is reversed for this cycle and the released reference power can immediately be booked as available.

What is important for the quality of the system is a synchronous operation between the installation and reference power management. The installation may only call up the reference power after its release by the management system. The shut-down of reference power should also run relatively synchronously. Otherwise, the energy balance will not be correct.

In the case of the reported quantities of reference power of the installations (PweaXcons), these are maximum values that an installation can draw in the respective situations. For example in the case of rotor-blade heating for an installation, the power of the heater coil and the power of the fan heater is reserved, even if only the fan is currently running. Thus the autonomous operation of peripherals of an installation is ensured.

By means of the reported maximum quantities of reference power of the installations and the maximum measured reference power at the NAP (network connection point), it is ensured that the total reference power at the NAP is not exceeded and that a relatively autonomous management of the installations is maintained. A precise adjustment of the reference power at the NAP, which would be difficult to implement from a technical standpoint, is hereby avoided.

FIGS. 4a to 4f show a situation of changing reference loads and possible progressions of the reference power therefor. The dashed progressions show the quantities of reference power that the respective wind turbines have reported as needed, and the solid progressions show the quantities of reference power that the respective wind turbines have actually received, and thus were able to reserve. This use of symbols also applies to FIGS. 4a to 4f as well as to FIGS. 5a to 5f.

The situation of changing reference loads is taken as a basis and described below for the points in time in question.

The example relates to a wind park having 5 wind turbines (WEAs) in the reference power management. The priority of the installations is allocated according to installation numbers (Installation 1=>highest priority to Installation 5 having the lowest priority).

A fixed maximum nominal reference of 700 kW is taken as a basis, which is described here as the withdrawal capacity, for which it is determined, for example by contractual obligation, that said capacity may or should not readily be exceeded. Any additional wind park power available in the wind park is not taken into consideration here or, respectively, is not available. This fixed withdrawal capacity is plotted as P Max. in FIG. 4a.

Minute 2: Installation 1 requires 100 kW and Installation 2 requires 500 kW; they thus reserve these quantities of power as reference power and also take these quantities of power, which is subsequently assumed for FIGS. 5a to 5f as well. Installation 4 requires 250 kW, but can cover a partial need with 50 kW, and thus only reserves 50 kW of reference power. Installation 5 requires 150 kW, can no longer cover its need, however, and therefore reserves no reference power. The total requirements of the exemplary wind park, which is designated as P Cons.(NAP) in FIG. 4a and also in FIG. 5a as P Cons.(NAP), is 650 kW. This power is referred to as reference power for the wind park and refers to the power that the group of wind turbines, in this case wind turbines 1 to 5, is currently drawing from the electrical supply network.

Minute 8: Installation 4 drops to 50 kW of the required needs. No change in the total supply.

Minute 11: Installation 1 requires 0 kW of power. 100 kW of power is released and Installation 5 can implement a demand of, and thus reserve 150 kW. 700 kW of total supply arises thus.

Minute 13: Installation 4 requires 250 kW, but has reserved an additional 50 kW of supply. There is still a 700 kW total supply.

Minute 19: Installation 4 drops to 50 kW of the required needs. No change in the total supply.

Minute 21: Installation 1 requires 100 kW, but does not receive this since none is available. No change in the total supply.

Minute 25: Installation 4 requires 250 kW, but has reserved an additional 50 kW of supply. There is still a 700 kW total supply.

Minute 27: Installation 2 releases 200 kW. The total supply is reduced to 500 kW. The power is not given to subsequent installations in the query order; for example to Installation 4 with a requirement of 250 kW. This power is only offered again in the next minute, thus in the next cycle. In that regard, the minutes that are shown and explained are also illustrative of cycles that may be times other than a minute. This also applies to FIGS. 5a to 5f.

Figure of priority: Installations closer to the front in the query order have a higher priority.

Minute 28: Installation 1 takes on 100 kW. Total supply of 600 KkW.

Minute 31: Installation 1 requires 0 kW of power. Total supply of 500 kW.

Minute 32: Installation 4 drops to 50 kW of the required needs. No change in the total supply. Installation 4 requires 250 kW, but has reserved an additional 50 kW of supply. There is still a 700 kW total supply.

Minute 37: Installation 4 requires and takes on 250 kW. Total supply of 700 kW.

Minute 41: Installation 1 requires 100 kW but does not receive this.

Minute 44: Installation 4 drops to 50 kW of the required needs. 200 kW of reference power are released. Total supply of 500 kW.

Minute 45: Installation 1 takes on 100 kW of the power that has been released. Total supply of 600 kW.

Minute 49: Installation 4 requires 250 kW, but has reserved an additional 50 kW of supply. There is still a 600 kW total supply.

Minute 51: Installation 1 requires 0 kW of power. Total supply of 500 kW.

Minute 52: Installation 4 requires and takes on 250 kW. Total supply of 700 kW.

Minute 57: Installation 2 releases an additional 300 kW. Total supply of between 200 and 500 kW. All installations can cover their needs.

FIGS. 5a to 5f are based on a situation of changing reference loads with changing, maximum nominal references, thus with a changing negotiated withdrawal capacity or, respectively, changing quantity of power available to the wind park, and are described below for the points in time in question. This changing withdrawal capacity is plotted as P Max. in FIG. 5a.

As in FIG. 4, the example relates to a wind park having 5 wind turbines in the reference power management system.

The priority of the installations is allocated according to installation numbers (Installation 1=>highest priority).

Minute 2: Installation 2 and Installation 5 are drawing power at 200 kW of total supply, thus 200 kW of the reference power for the wind park.

Minute 11: Installation 2 takes on 250 kW of reference power. 500 kW is the total supply or, respectively, the reference power for the wind park, namely the power that all 5 wind turbines draw as a reference power in total at the moment.

Minute 14: The target reference power, thus the negotiated withdrawal capacity, is lowered to 400 kW. A negative target value/actual value comparison (sufficient reference power no longer available) results in a need to adjust the energy consumed by the installations. The installations are queried in the reverse order based on the prioritization. Depending on the negative target value/actual value comparison, the reference power released by the installations is immediately included in the available energy for the respective subsequent installation in order to avoid unnecessary shut-downs.

With the lowest priority, Installation 5 immediately ceases energy consumption. The result is a total supply of 350 kW.

Minute 18: Installation 4 drops to 50 kW of the required needs. 200 kW of reference power are released. Installation 5 can again take on 150 kW, but only in the next cycle at Minute 19. The total supply is then 300 kW.

Minute 21: Installation 1 requires 0 kW of power. Total supply of 200 kW.

Minute 25: Installation 3 requires 100 kW of power. Total supply of 300 kW.

Minute 31: Installation 1 requires 100 kW of power. Total supply of 400 kW (maximum).

Minute 36: The target reference power is lowered to 200 kW. Based on their prioritization, Installations 5+4 drop to 0 kW. Total supply of 200 kW.

Minute 41: Installation 1 requires 0 kW of power. Installation 4 takes on 50 kW of power. Total supply of 150 kW.

Minute 54: Installation 2 pushes for 200 kW of power but does not receive this, since only 50 kW of reference power remain.

Minute 57: The target reference power, thus the negotiated withdrawal capacity, is increased to 450 kW. Installation 1 takes on 100 kW and Installation 2 takes on 200 kW. Total supply of 450 kW.

Minute 61: Installation 1 requires 0 kW of power. Total supply of 350 kW.

Minute 65: Installation 3 reduces its consumption to 50 kW. Installation 5 takes on 150 kW. Total supply of 450 kW.

In summary, the following can at least be explained in a simplistic manner by way of example.

The reference power is allocated to the respective installations according to priority (order of query). If an installation has reserved reference power, the installation retains this power until it no longer requires this supply. This results in a temporary prioritization. The reference power is allocated to the installation that reports its need first. If a plurality of installations report a need for reference power at the same time, the order in which the installations are queried decides the prioritization. This ensures that power that is released is allocated according to priority.

If more power is drawn than is reserved, reserved reference power must be taken away from the installations. This is the case when the target reference power is lower. In the case of this exception, the forced return of the reference power is carried out in accordance with the priority list. Installations having a low priority must give up their power first.

The invention claimed is:

1. A method for controlling a power consumption of a group of a plurality of wind turbines, wherein the wind turbines are prepared for feeding electrical energy into an electrical supply network, the method comprising:

offering an energy supply to the group of the plurality of wind turbines for consumption, wherein the energy is offered:

in recurring cycles, in a predetermined order,
successively such that for each cycle the energy supply is offered to a first wind turbine first and then to subsequent wind turbines in the predetermined order, and
as a function of an entire amount of power available to the wind park for consumption, and wherein:
each wind turbine is configured to reserve the energy supply as a reference power, and
the subsequent wind turbines in the cycle are provided with, at most, the power available to the wind park, minus the reference power already reserved, as the energy supply by the first wind turbine.

2. The method according to claim 1, wherein the group of the plurality of wind turbines forms a wind park or a part of a wind park.

3. The method according to claim 1, wherein the power available to the wind park is determined from the sum of:
a predetermined withdrawal capacity that can be withdrawn from the electrical supply network, and
a wind park output of the wind park or the group of wind turbines that is offered by at least one of generation and accumulation.

4. The method according to claim 1, wherein during a current cycle
the energy supply offered to the plurality of wind turbines is calculated from:
a currently available reference power; and
the reference power reserved by the respective wind turbine during the preceding cycle.

5. The method according to claim 4, wherein:
the available reference power is calculated for the first wind turbine of the predetermined order from:
the power available to the wind park; and
minus a current reference power for the wind park, which is currently being drawn from the electrical supply network by the group, or minus the total reference power reserved for the group.

6. The method according to claim 4, wherein:
an available reference power of the subsequent wind turbine arises from available reference power of a preceding wind turbine in the predetermined order, and in that:
the available reference power is reduced for a subsequent wind turbine if a preceding wind turbine increases its reserved reference power as compared to the preceding cycle, and
the available reference power for the subsequent wind turbine remains unmodified if the preceding wind turbine retains or reduces its reserved reference power as compared to the preceding cycle.

7. The method according to claim 1, wherein the predetermined order is determined or modified as a function of at least one boundary condition.

8. The method according to claim 1, wherein a withdrawal capacity that is to be withdrawn from the electrical supply network is based on a value that corresponds to the sum of all possible power usages by the wind turbine of the group, and corresponding to a greatest sum of all possible power usages.

9. The method according to claim 1, wherein the reserved reference power of at least one of the wind turbines is reduced if the sum of the reserved power from the preceding cycle is greater than the power available to the wind park.

10. The method according to claim 1, further comprising when the total of the reserved reference power exceeds the power available to the wind park, the recurring cycles are run contrary to the predefined order.

11. The method according to claim 10, wherein the reserved reference power of a last wind turbines of the subsequent wind turbines is initially reduced and the reserved reference power of the subsequent wind turbines are successively reduced contrary to the predetermined order until the total of the reserved quantities of reference power exceeds the power available to the wind park.

12. The method according to claim 1, wherein the plurality of wind turbines use the respective, reserved reference power to at least one of: heat their rotor blades, heat their generator, and start the wind turbine.

13. The method according to claim 1, wherein:
the recurring cycles repeated in a time range of a half minute to 5 minutes.

14. The method according to claim 1, wherein at least one reserved reference power of the wind turbines of the group and/or the power available to the wind park and the current reference power for the wind park for a predetermined transition period remain unmodified when a communication failure occurs between the plurality of wind turbines of the group.

15. A group of a plurality of wind turbines implementing the method according to claim 1.

16. The group according to claim 15, comprising a central control unit is utilized for carrying out the method.

17. The group according to claim 16, wherein the central control unit is a farm control unit.

18. The method according to claim 6, wherein the available reference power is reduced for the subsequent wind turbine by the value by which the preceding reserved reference power was increased.

19. The method according to claim 7, wherein the at least one boundary condition is an environmental condition.

20. The method according to claim 1, further comprising manually interrupting a current cycle of recurring cycles and manually assigning the reference power to each wind turbine.

* * * * *